Figure 1:
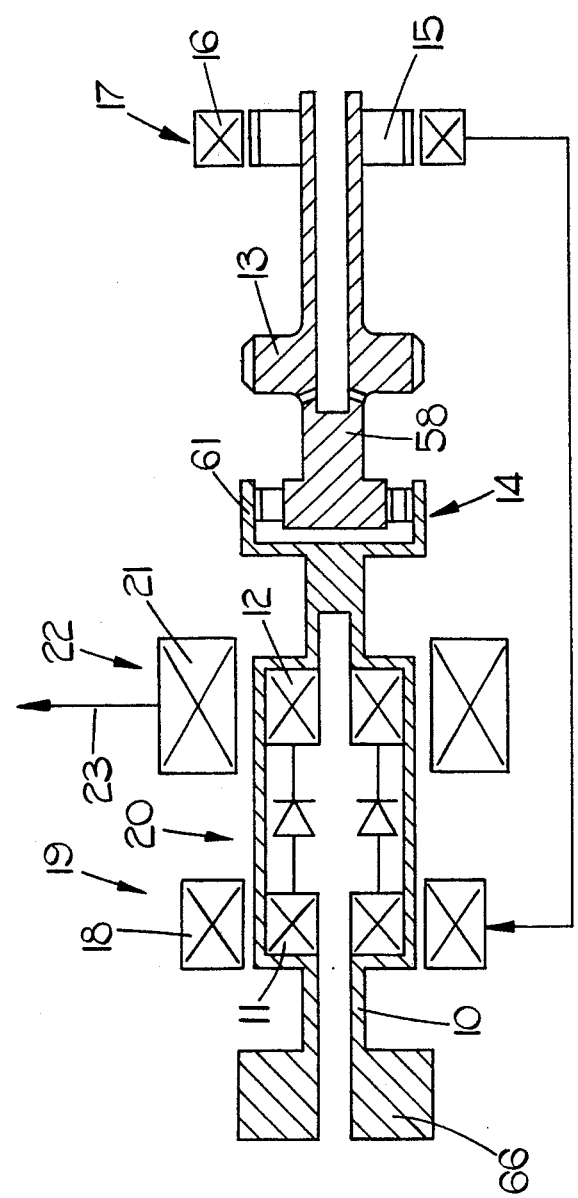

United States Patent [19]

Griffiths et al.

[11] 4,278,928
[45] Jul. 14, 1981

[54] ELECTRIC GENERATOR ARRANGEMENT

[75] Inventors: Trevor J. Griffiths; Raymond Sharpe, both of Bradford; Peter Hunt, Shipley, all of England

[73] Assignee: Lucas Industries Limited, Birmingham, England

[21] Appl. No.: 831,105

[22] Filed: Sep. 7, 1977

[30] Foreign Application Priority Data

Sep. 8, 1976 [GB] United Kingdom ............... 37141/76
Apr. 14, 1977 [GB] United Kingdom ............... 15617/77

[51] Int. Cl.³ ...................... H02P 15/00; F16H 47/04
[52] U.S. Cl. ...................................... 322/29; 74/687; 322/40
[58] Field of Search ...................... 74/687; 322/29, 32, 322/35, 38, 40, 28, 62; 55/203, 204, 205; 310/185

[56] References Cited

U.S. PATENT DOCUMENTS

| | | |
|---|---|---|
| 1,453,166 | 4/1923 | Nobuhara . |
| 2,474,706 | 6/1949 | Wahlmark . |
| 2,485,126 | 10/1949 | Wood . |
| 2,518,129 | 8/1950 | Eichhorn ............................... 322/40 |
| 2,634,907 | 4/1953 | Smith ................................ 55/203 X |
| 2,731,569 | 1/1956 | Cardillo et al. . |
| 2,803,112 | 8/1957 | Sadler, Jr. et al. . |
| 2,810,844 | 10/1957 | Morrill . |
| 2,885,566 | 5/1959 | Sadler et al. . |
| 2,890,604 | 6/1959 | Campbell, Jr. . |
| 2,946,194 | 7/1960 | Westbury . |
| 3,023,638 | 3/1962 | Westbury et al. . |
| 3,056,914 | 10/1962 | Potter ..................................... 322/40 |
| 3,187,250 | 6/1965 | Born et al. .......................... 322/40 X |
| 3,274,855 | 9/1966 | Reynolds et al. . |
| 3,298,251 | 1/1967 | Moss . |
| 3,365,981 | 1/1968 | Gantzer . |
| 3,462,625 | 8/1969 | Endress . |
| 3,576,143 | 4/1971 | Baits ....................................... 74/687 |
| 3,626,787 | 12/1971 | Singer ..................................... 74/687 |
| 3,733,924 | 5/1973 | Zentz et al. ............................. 74/687 |
| 3,758,843 | 9/1973 | Ishizaki et al. ...................... 322/28 X |
| 3,786,696 | 1/1974 | Aleem ..................................... 74/687 |
| 3,869,939 | 3/1975 | Miyao ..................................... 74/687 |
| 3,942,961 | 3/1976 | Holliday et al. ........................ 55/203 |
| 4,074,180 | 2/1978 | Sharpe et al. ........................... 322/29 |

FOREIGN PATENT DOCUMENTS 485225 5/1938 United Kingdom .
1217855 12/1970 United Kingdom .

OTHER PUBLICATIONS

Institute of Mech. Engineers, 1961, Paper No. 5 Westbury et al., "A Double-Differential Hydrostatic Constant-Speed Alternator Drive".
Mackerle, "Air Cooled Automotive Engines" J. Wiley & Sons, Inc., 1972, pp. 378-381.
AIEE, 1944, vol. 65, pp. 1314-1320, Earnshaw, Shearer, "AC Supplies for Services in Large Aircraft".
Teichmann, "Fundamentals of Aircraft Piston Engines", Hayden, Inc., N.Y., 1971, pp. 106-111.
"The Aircraft Engine and Its Operation", 2/55, pp. 3-5, 7-9, 11-18, 36-39, 95, 96, United Aircraft Corp.

Primary Examiner—Robert J. Hickey
Attorney, Agent, or Firm—Neuman, Williams, Anderson & Olson

[57] ABSTRACT

An electric generator arrangement comprises a generator and a continuously-variable ratio drive, whereby the generator can be driven at a constant speed over a range of speeds applied to an input shaft. The drive comprises an epicyclic differential gear having a planet gear carrier driven by the input shaft, a sum gear coupled to coupled to the generator and a ring gear. The ring gear can be driven at varying speeds by hydraulic units to vary the ratio of the speeds of the input shaft and the sun gear. The hydraulic units are driven by the input shaft and the speed of the ring gear is controlled by an electro-hydraulic control system which is responsive to the frequency of an output signal from a part of the generator. Fluid under pressure for the hydraulic units and the hydraulic control system is provided by a combined pump and de-aerator on the shaft of another part of the generator.

29 Claims, 17 Drawing Figures

ELECTRIC GENERATOR ARRANGEMENT

This invention relates to an electric generator arrangement.

According to the invention an electric generator arrangement comprises an electric generator having a stator and a rotor, a continuously variable ratio drive means having an input shaft and an output shaft, said output shaft being drivingly connected to the rotor of said generator, hydraulic control means, responsive to the speed of said output shaft, for varying the ratio of the speeds of said input and output shafts, a centrifugal liquid-air separator including an impeller co-axial with said generator rotor, said impeller being connected to said rotor for rotation therewith, and a pumping chamber surrounding said impeller, a first passage for delivering hydraulic fluid to said chamber, means for delivering separated liquid under pressure from said chamber to said hydraulic control means.

Figure 2:
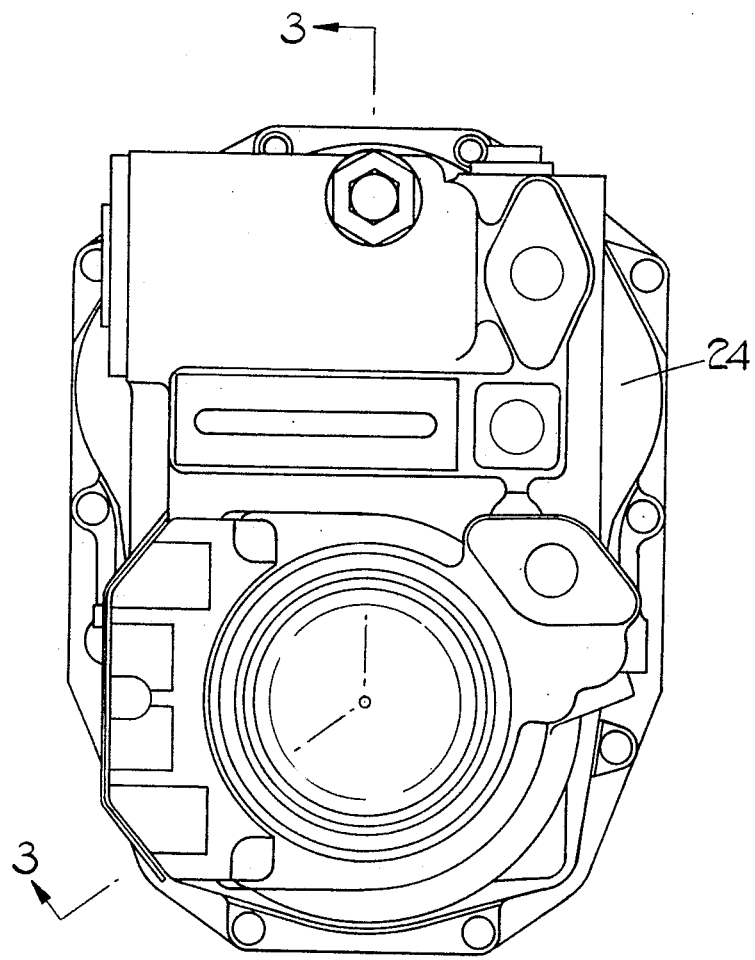
Figure 3:
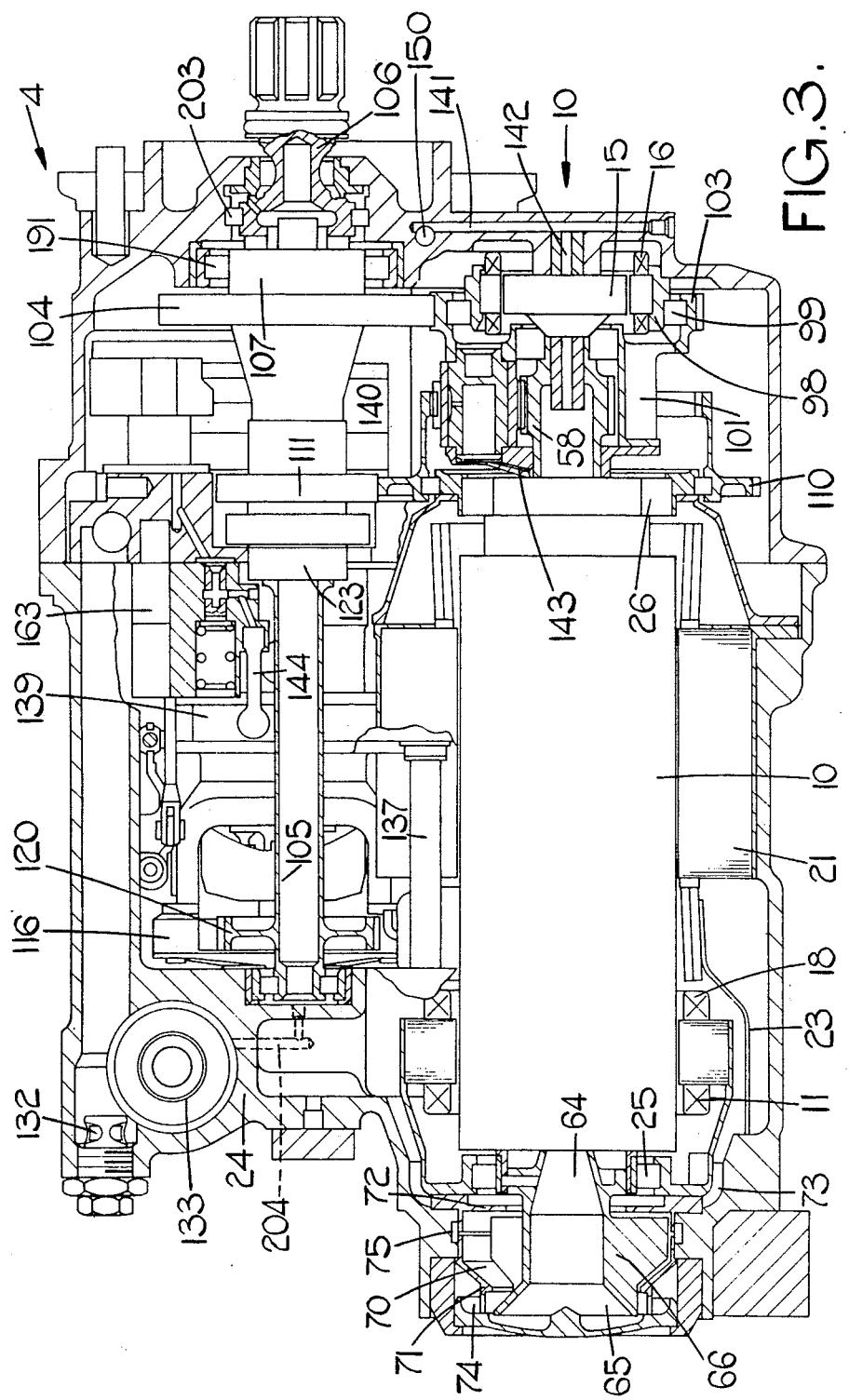
Figure 4:
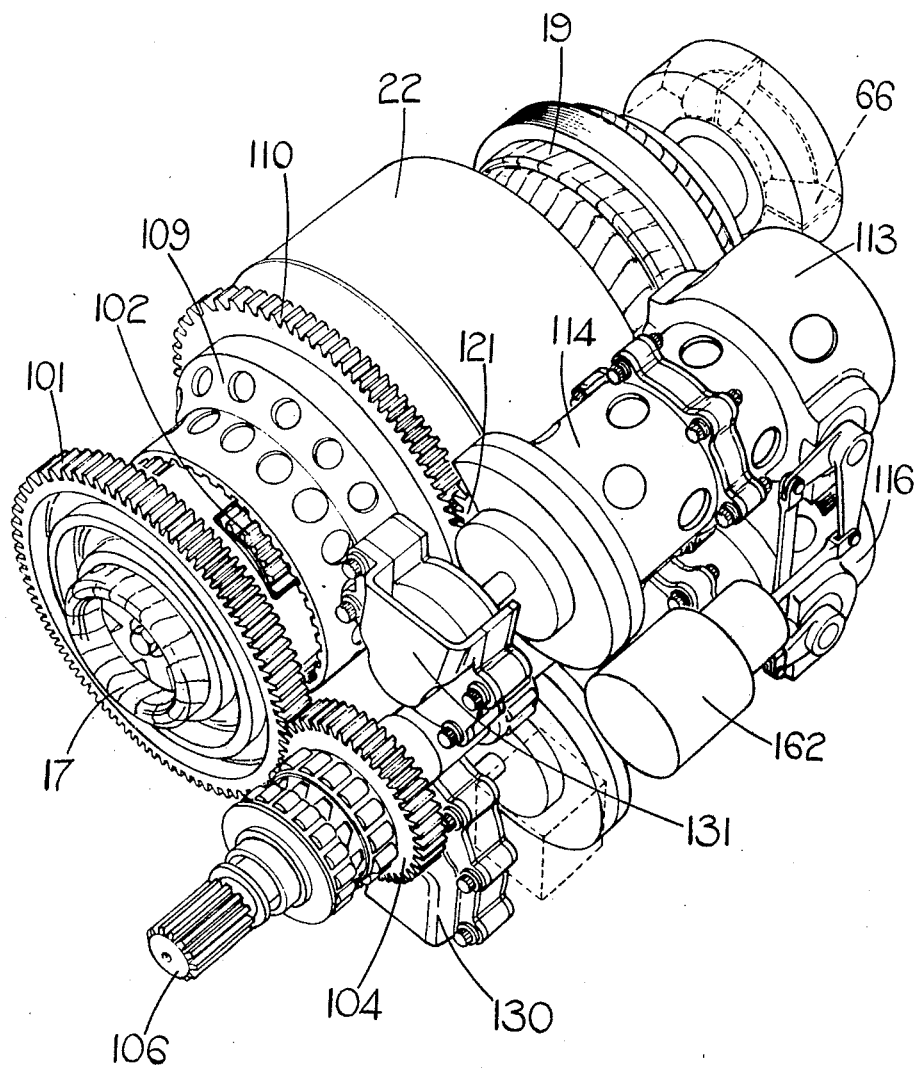
Figure 5:
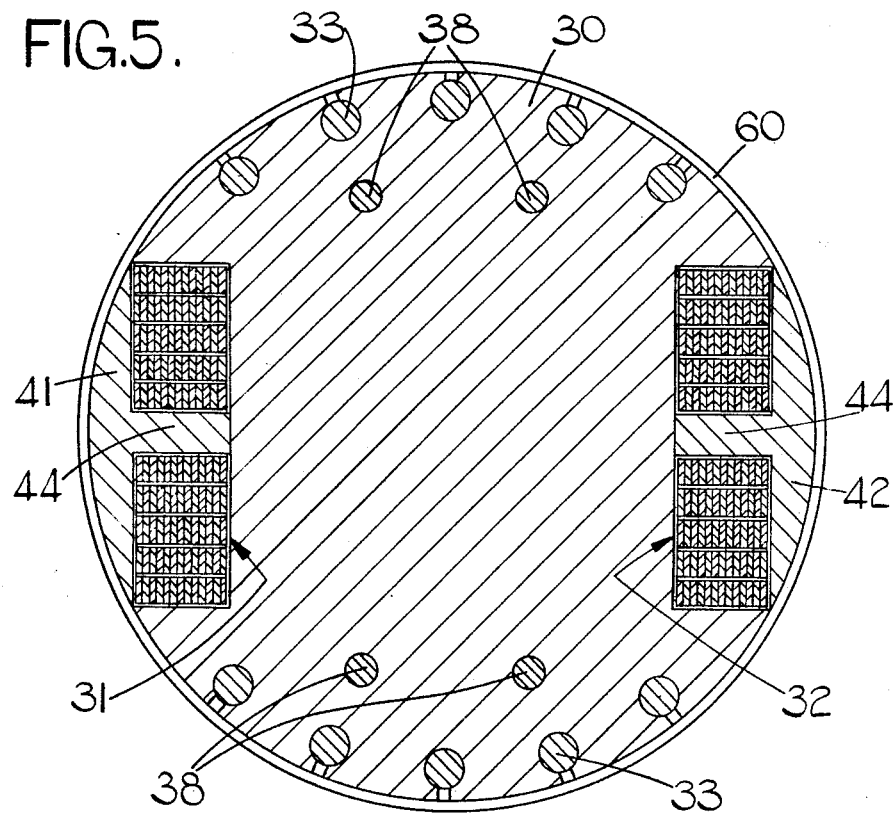
Figure 6:
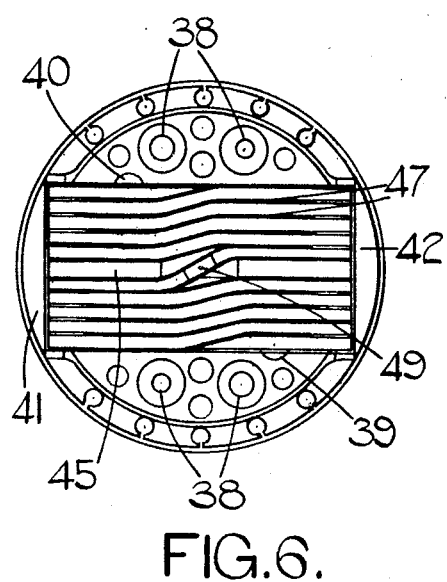
Figure 7:
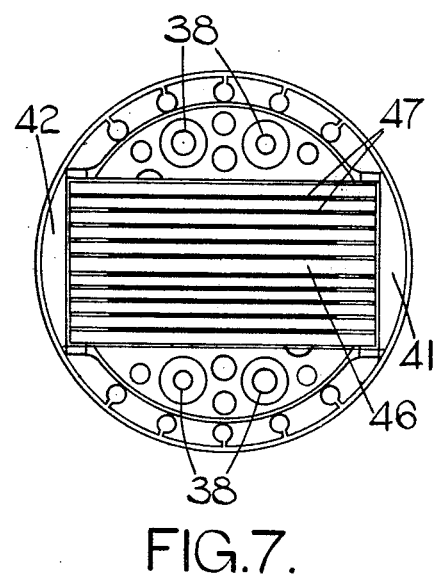
Figure 8:
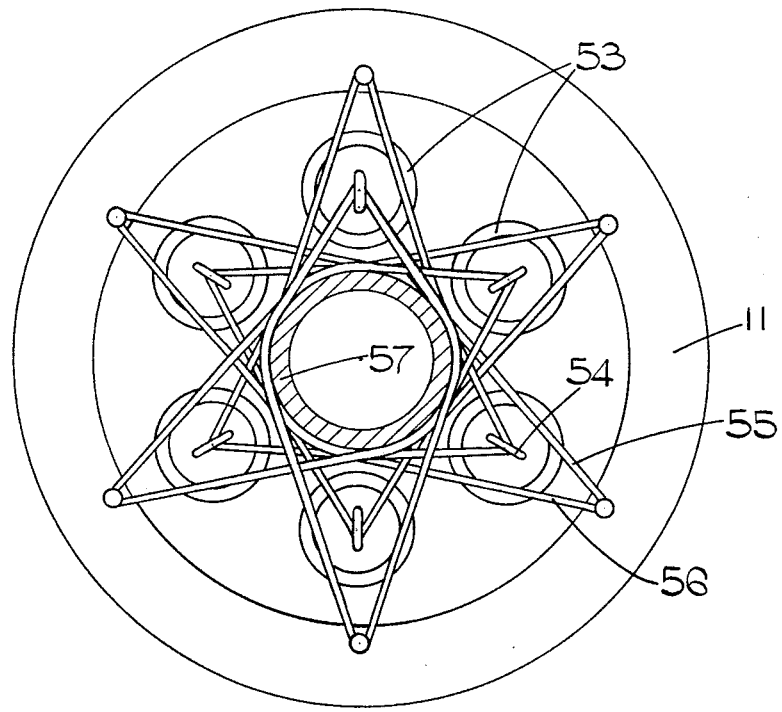
Figure 9:
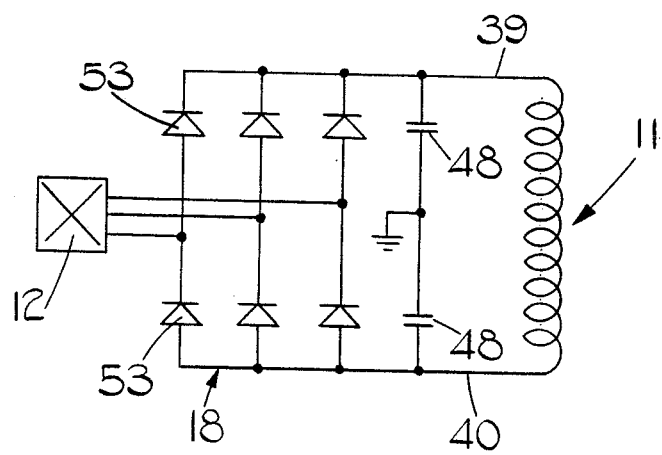
Figure 10:
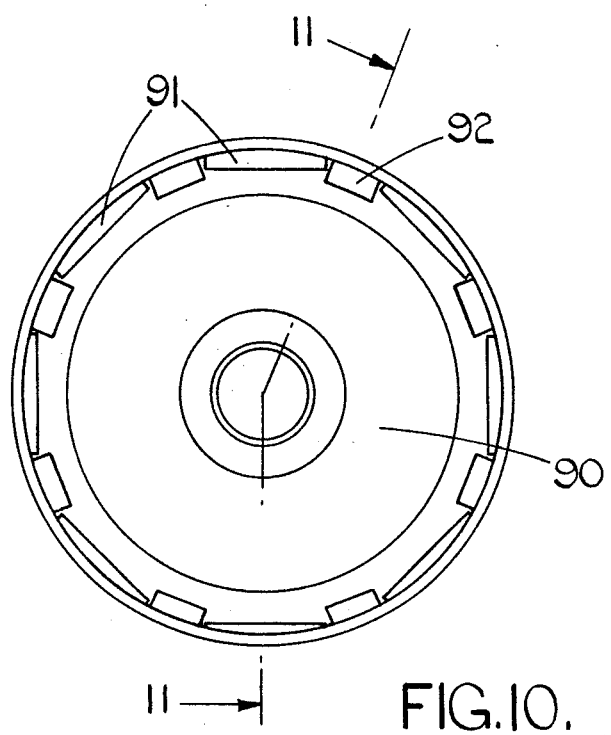
Figure 11:
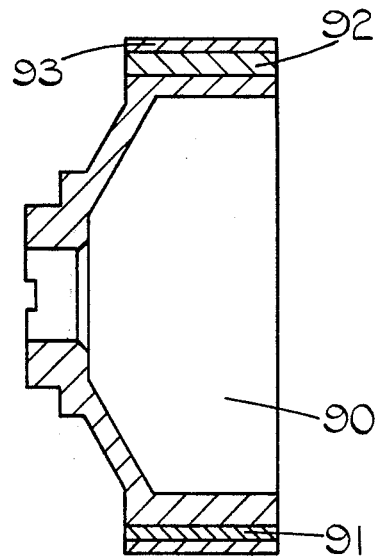
Figure 12:
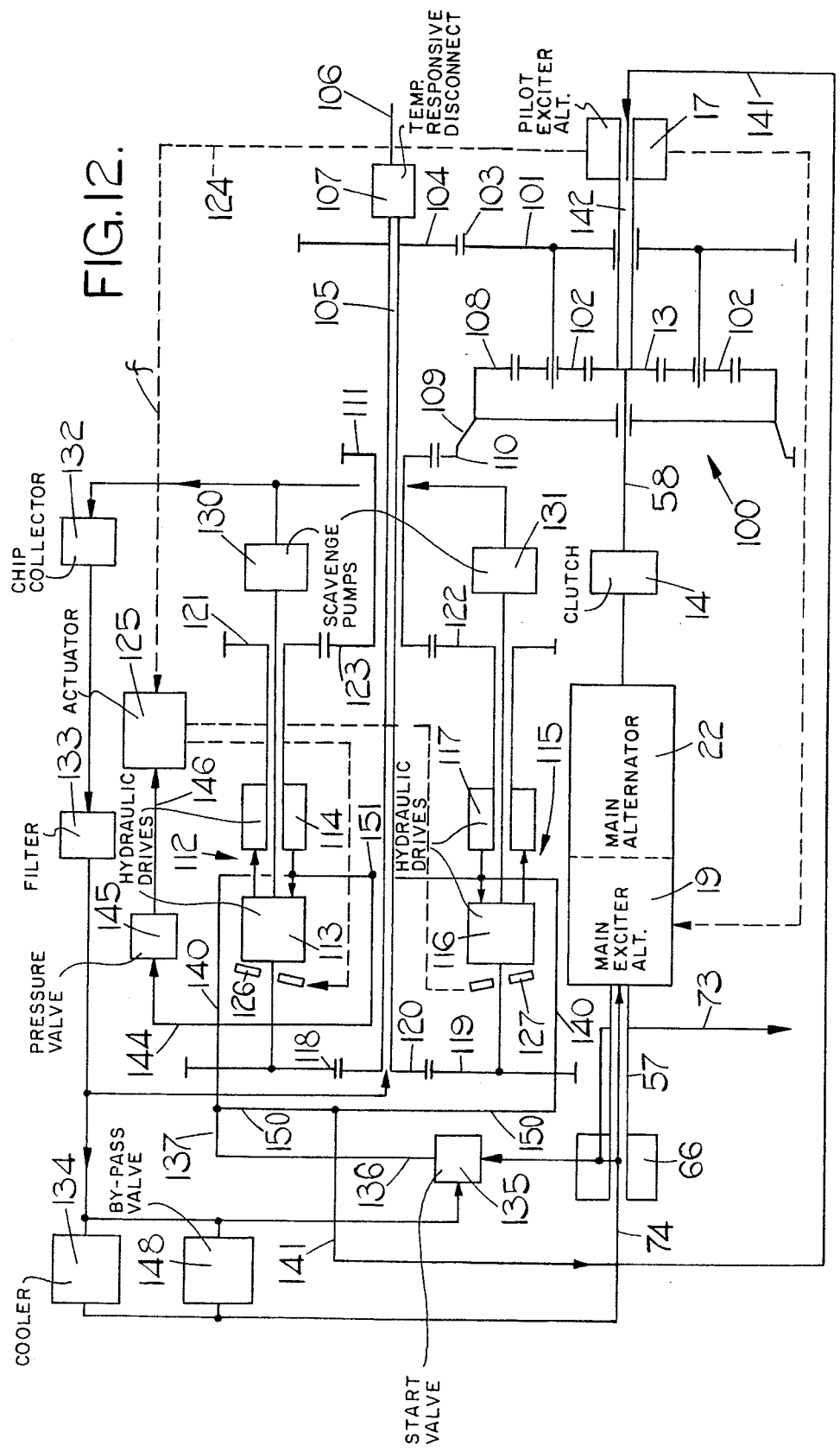
Figure 13:
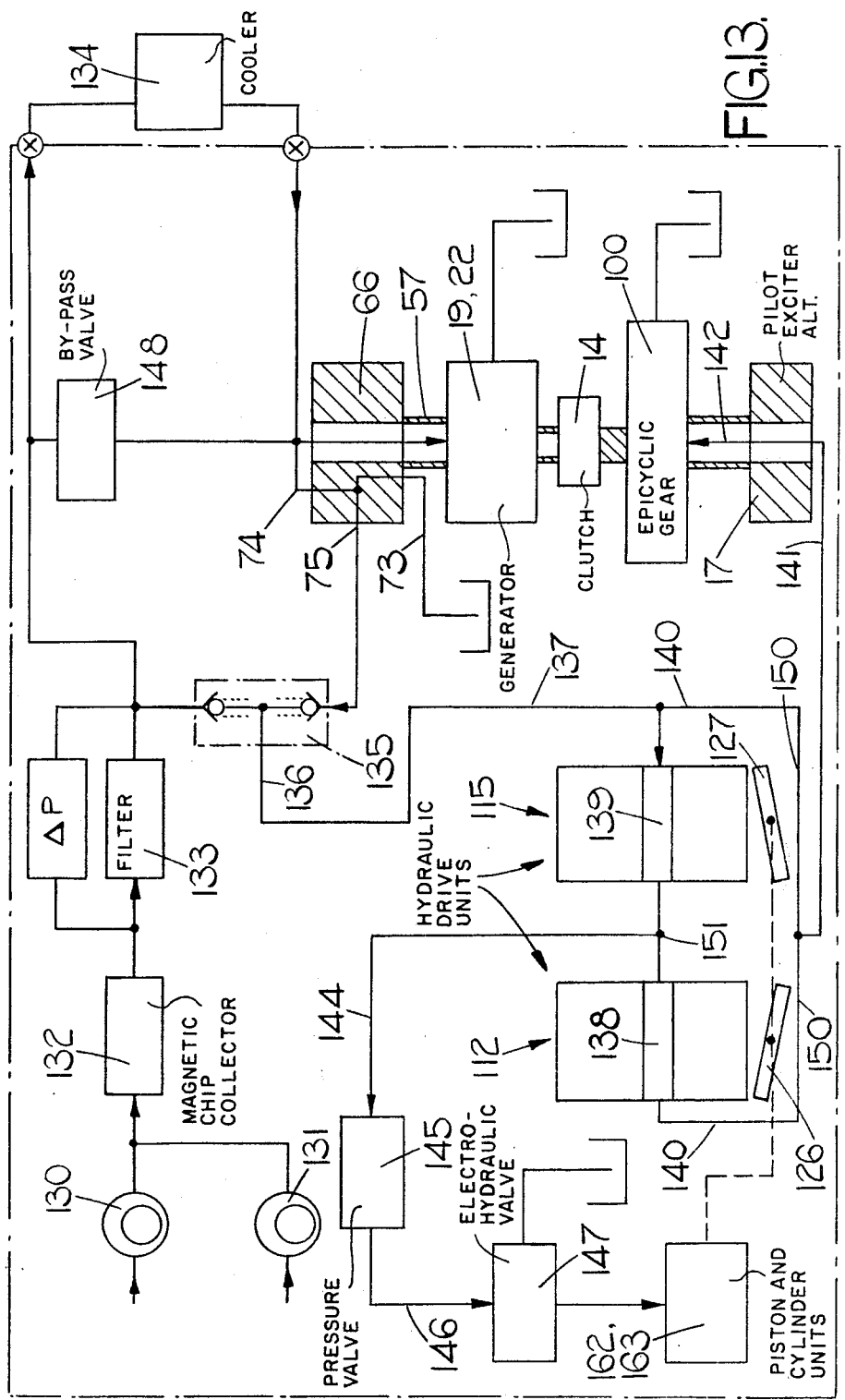
Figure 14:
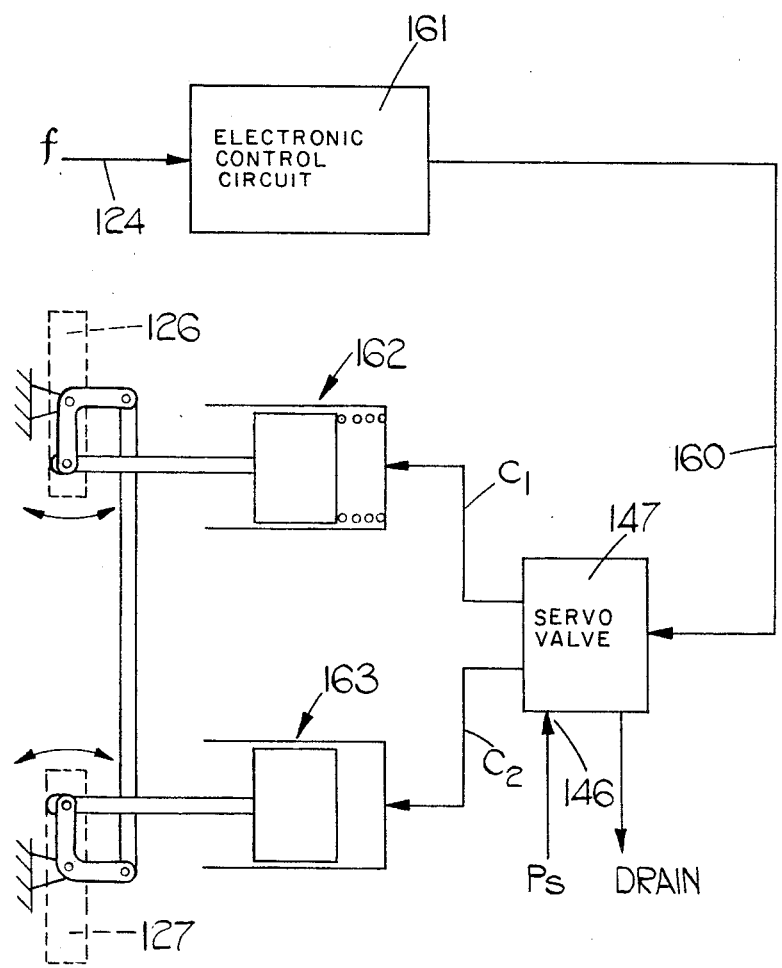
Figure 15:
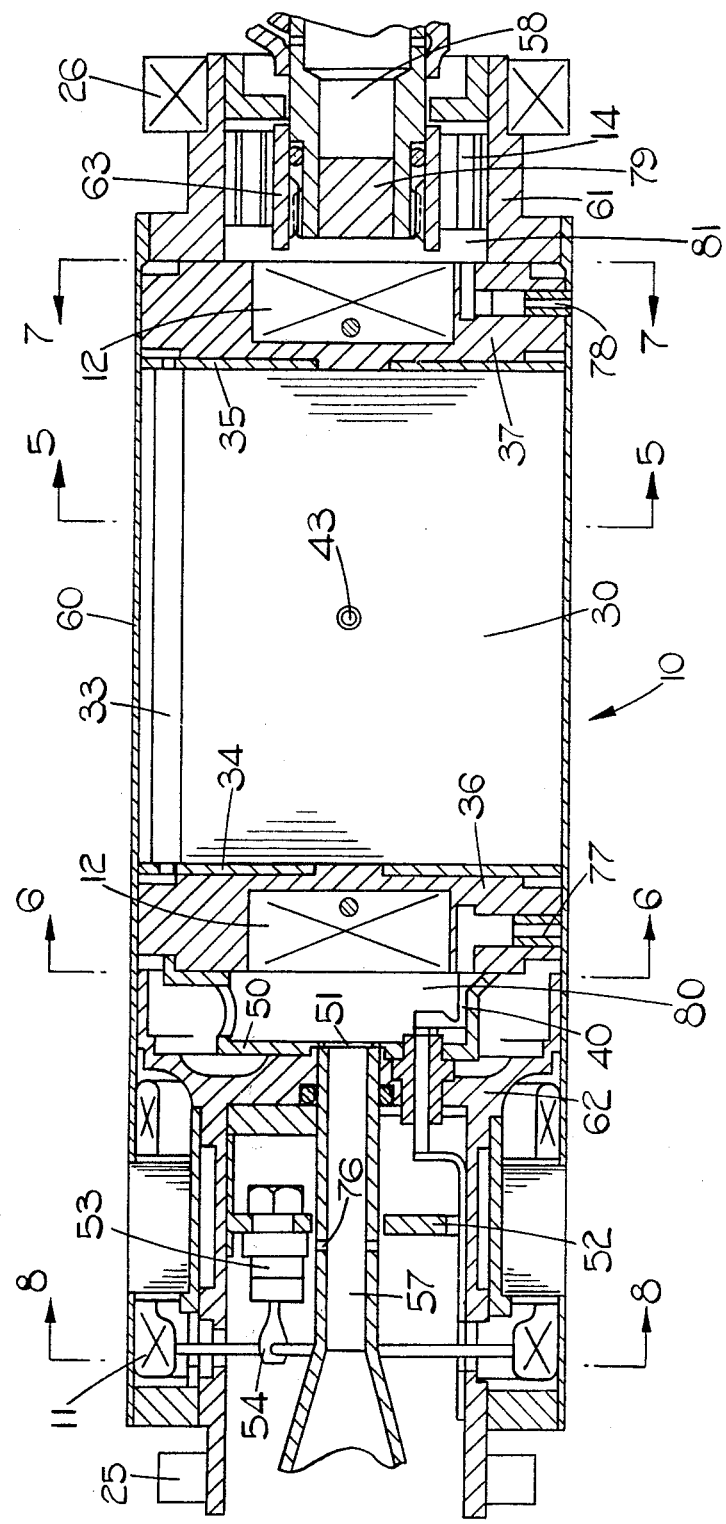
Figure 16:
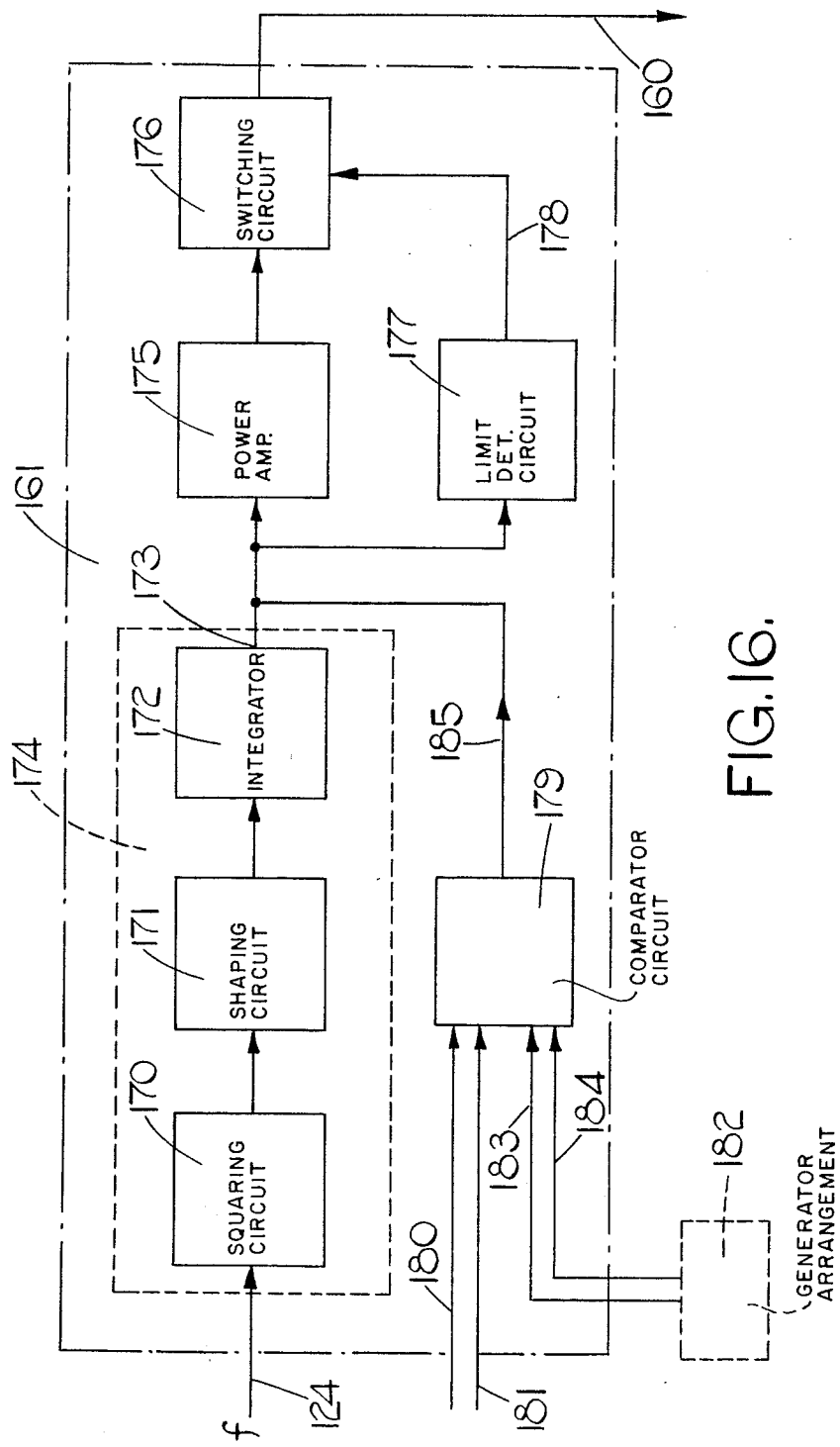
Figure 17:
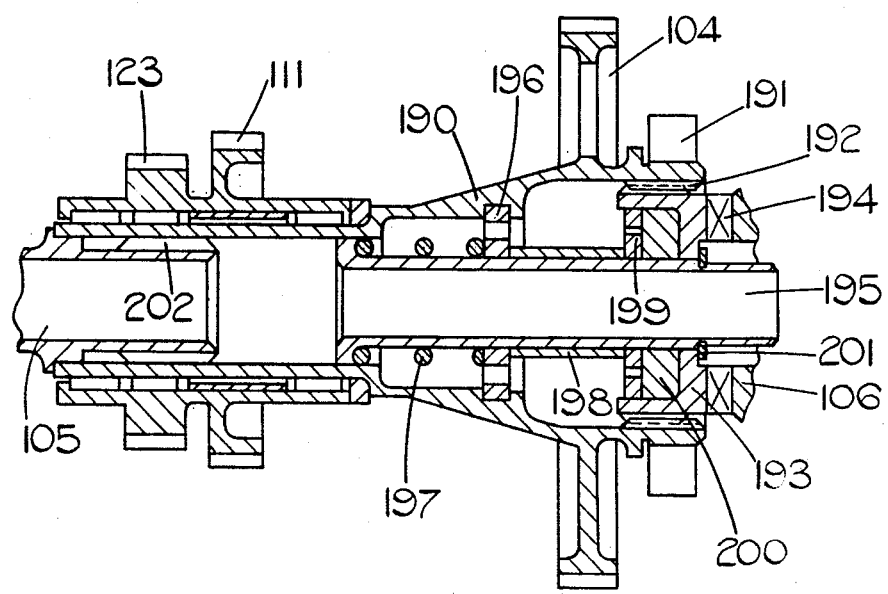

An embodiment of the invention will now be described by way of example only and with reference to the accompanying drawings in which:

FIG. 1 shows, diagrammatically, a generator and driving means according to the invention, FIG. 2 is an outside end view of a housing for the generator arrangement, FIG. 3 is a section on line 3—3 in FIG. 2, FIG. 4 is a perspective view, with the housing removed, generally in the direction of arrow 4 in FIG. 3, FIG. 5 is a section, to an enlarged scale of the main alternator rotor, on line 5—5 in FIG. 15, FIG. 6 is a view, to a reduced scale, on line 6—6 in FIG. 15 of one end of the main alternator rotor, FIG. 7 is a view, to a reduced scale, on line 7—7 in FIG. 15 of the other end of the main alternator rotor, FIG. 8 is a view, to an enlarged scale, on line 8—8 in FIG. 15 of the generator rectifier arrangement, FIG. 9 shows a rectifier circuit for the generator, FIG. 10 shows to an enlarged scale, the pilot alternator exciter rotor, as viewed on arrow 10 in FIG. 3, FIG. 11 is a section on line 11—11 in FIG. 10, FIG. 12 shows, diagrammatically, the generator and the arrangement of the driving means, FIG. 13 shows the hydraulic circuit for the generator arrangement as a whole, FIG. 14 shows, diagrammatically, an electro-hydraulic arrangement for controlling the displacement of hydraulic units forming part of the driving arrangement, FIG. 15 is a section on line 3—3 in FIG. 2 and to a larger scale, of the generator rotor indicated in FIG. 3, FIG. 16 is a block diagram of an electronic control circuit forming part of the arrangement of FIG. 14, and FIG. 17 is a section, to a larger scale, through the thermal disconnect device indicated in FIGS. 3 and 13.

As shown in FIG. 1 a main generator has a rotor 10 which includes a first winding 11 and a second winding 12, the windings 11 and 12 rotating with a shaft which forms part of the rotor 10. The rotor 10 can be driven by a drive arrangement, later to be described, the drive arrangement including a sun gear 13 which drives the rotor 10 through the medium of an overrunning sprag clutch 14. The gear 13 is directly coupled to a permanent magnet rotor 15, shown in more detail in FIGS. 10 and 11. The rotor 15 co-operates with a stator winding 16 to define a pilot exciter alternator 17. A main generator stator is provided by windings 18,21. Winding 18 co-operates with the second winding 11 to define a main exciter alternator 19. The winding 18 is energised by current from the winding 16 of the pilot alternator 17. Alternating current from the winding 11 of the main exciter alternator 19 is supplied to the winding 12 via a rectifier arrangement 20. The winding 12 co-operates with the stator winding 21 to define a main alternator 22. An alternating output from the generator as a whole is provided from the stator winding 21, on an output line 23.

As shown in FIGS. 2 and 3 the generator arrangement has a housing 25 which hermetically surrounds the generator and its associated driving means. In the arrangement shown in FIG. 15 the several parts of the generator rotor 10 have been given the same numbers as the corresponding parts of FIG. 1. The stator windings 18, 21 and the pilot exciter alternator winding 16 are supported in the housing 24. The rotor 10 is supported in the housing 24 by means of bearings 25, 26. As shown in FIGS. 5 and 15 the rotor 10 includes a laminated soft iron core 30 formed with diametrically opposite longitudinal slots 31,32. The core 30 also has 10 peripheral slots through which extend copper damping rods 33. The respective ends of the rods 33 are secured to copper end plates 34, 35 on the core 30. Coil support blocks 36, 37 of titanium alloy are mounted at opposite ends of the core 30 and have transverse grooves for receiving the turns of the winding 12. The blocks 36, 37 are located on the core 30 by four bolts 38 which pass axially through the core 30. The blocks 36, 37 are retained in position on the core 30 by the winding 12. The winding 12 comprises 130 turns of rectangular section wire, the turns being arranged, as shown more clearly in FIG. 5, in two sections, each section being arranged in five columns with 13 turns in each column. A free end of one section is secured to a free end of the other section, as shown at 49 in FIG. 6. The free ends 39, 40 of the winding 12 as a whole are lead axially of the rotor through slots in the support block 36. The axially extending parts of the winding 12 lie within the grooves 31, 32 and are maintained in place by clamps 41, 42 which are secured to the core 30 by bolts 43 (FIG. 15). The outer surfaces of the clamps 41, 42 are finished flush with the periphery of the core 30. The clamps 41, 42 each have a tongue 44 which spaces apart the two sections of the winding turns within the grooves 31, 32. At the ends of the core 30 the winding sections are spaced by respective spacers 45, 46 as shown in FIGS. 6 and 7, and the columns of turns are themselves spaced by spacers 47. The spacers 47 do not extend diametrically beyond the bottoms of the slots 31, 32 in the core 30. There is thus defined, within the slots 31, 32, a plurality of passages between the columns of the winding 12, these passages extending axially of the core 30 between the ends thereof.

As shown in FIG. 15, a part 50 having an axial through hole 51 is secured to the block 36. Fixed relative to the part 50 is an annular element 52 on which is mounted the rectifier arrangement 20 indicated in FIG. 1, the rectifier arrangement 20 comprising 6 stud mounted diodes 53 arranged on a pitch circle as shown in FIG. 8. One terminal of each of the diodes 53 is connected to the winding 11, and the other terminals of the diodes 53 are connected to the winding 12. FIG. 9 shows the circuit of the rectifier arrangement 20. The output of winding 11 of the main exciter alternator 19 is a three-phase current. The diodes 53 are arranged in two groups of three, the mounting studs of the diodes in one group providing anode connections and the mounting studs of the diodes in the other group providing cathode connectings. The rectifier arrangement 20 is connected to the winding 12 by means of the free ends 39, 40 thereof, and two capacitors 48 are connected in series across the ends 39, 40, the common point of the capacitors 48 being connected to earth.

The axes of the terminal lugs 54 of the diodes 53 extend parallel to the axis of rotation of the rotor 10. As shown in FIG. 8 the respective lugs 54 are electrically connected to diametrically opposite terminal points on the winding 12 by identical insulated wires 55, 56 which pass around opposite sides of a central tube 57. The lengths and diameters of the wires 55, 56 are selected so that the sum of the centrifugal forces acting on each lug 54 and on the portions of the wires 55, 56 adjacent that lug 54 on one side of the axis of the rotor 10, is balanced by the centrifugal forces acting on the portions of the wires 55, 56 on the other side of the axis of the rotor 10. Tendency of the lugs 54 to bend radially outwards under the effect of centrifugal forces is thus resisted by the tension in the wires 55, 56, but this tension is not applied to the terminal points on the winding 11. Moreover, a centrifugal force on a wire 55, acting to urge a lug 54 circumferentially of the axis of the rotor 10, is opposed by a centrifugal force on a wire 56 urging that lug in the opposite direction.

A cylindrical non-magnetic monel metal sleeve 60 is shrunk on to the core 30 and the clamps 41, 42 so as to be in driving engagement therewith. The sleeve 60 is also welded to two non-magnetic stainless steel stepped members 61, 62 which are at respective ends of the sleeve 60 and are thus in driving connection therewith. The members 61, 62 are supported by the respective bearings 26, 25. The member 61 provides an outer element of the sprag clutch 14 whose inner element 63 is in splined engagement with a shaft 58 which is integral with the sun gear 13. The winding 11 is secured to the stepped member 62. The gear 13 can thus drive the windings 11, 12 through the medium of the sprag clutch 14, the members 61, 62 and the sleeve 60.

The sleeve 60 and members 61, 62 provide a rigid casing which supports the rotor 10 as a simple beam between the bearings 25, 26 the axial spacing of the bearings 25, 26 being greater than that of the combined axial lengths of the windings 11, 12.

The rotor construction described enables the required cross-sectional area of iron in the core 30 to have a minimum diameter, since no shaft is required to be passed through the rotor. The sleeve 60 occupies a position in the generator which would normally be part of the air gap. The sleeve 60 can be made relatively thin walled and light and yet be as rigid as a solid shaft of considerable diameter.

The tube 57, referred to above in connection with FIG. 8, extends axially through the stepped member 62 and is rigidly secured to the member 62 so as to be driven thereby. One end of the tube 57 is aligned with the hole 51 in the part 50 (FIG. 15) and this end of the tube 57 passes sealingly through a transverse wall of the stepped member 62. As shown in FIG. 3, the tube 57 has first and second frusto-conical portions 64, 65 whose larger diameters are directed towards the end of the tube 57 remote from the core 30. Integral with the tube 57 is a four-bladed impeller 66 which, by virtue of the connection of the tube 57 to the member 62, rotates with the rotor 10.

The impeller 66 forms part of a combined pump and centrifugal liquid-air separator. The combined separator and pump includes a pumping chamber 70 which surrounds the impeller 66 and has a first radially inwardly extending annular wall 71 and a second radially inwardly extending annular wall 72. The inner end of the wall 71 is at a greater radial distance from the axis of the rotor 10 than is the inner end of the wall 72. The zone adjacent the roots of the blades of the impeller 66 communicates with the inside of the housing 24 via an annular passage 73. The pressure at the inner end of the wall 72 is thus that within the housing 24 generally. When the impeller 66 is running at its designed speed the radial pressure increase has the effect that the pressure at the inner end of the wall 71 is 50 psi higher than that within the housing 24 generally. Fluid cannot therefore enter the pumping chamber 70 unless it is at least 50 psi higher than the pressure within the housing 24. Hydraulic fluid is supplied to an annular inlet passage 74 by scavenge pumps, later to be described, either of these scavenge pumps being capable of providing the necessary pressure within the annular inlet passage 74. The pumping chamber 70 has an annular outlet passage 75 to which hydraulic fluid is delivered by the impeller 66 at a pressure at 350 psi. The capacity of the combined de-aerator and pump, provided by the impeller 66 and chamber 70, is such as to be able to cope with the highest anticipated demand of the apparatus. At lower demands the separated liquid extends radially inwardly to the inner end of the wall 72, which thus acts as a spill valve to return excess separated liquid to the volume within the housing 24 generally. The wall 71 prevents the pressure in the inlet passage 74 from falling as a result of increase in the pumping action of the impeller 66. The wall 71 thus acts, effectively, as a pressurising valve which maintains the pressure in the unseparated cooling fluid flowing to the alternators 19, 22.

A proportion of the hydraulic fluid in the annular inlet passage 74 does not enter the pumping chamber 70 but passes through the tube 57 to cool the rotors and stators of the main exciter alternator 19 and main alternator 22, the impeller 66 having no effect on this latter portion of the hydraulic fluid.

A part of the fluid within the tube 57 can pass out through radial holes 76 in the tube 57 to flow over the diodes 53 and the winding 11 before being ejected radially outwardly on to the winding 18. The remainder of the fluid within the tube 57 passes to a zone 80 adjacent the coil support block 36. Two nozzles 77 are at diametrally opposed positions in the support block 36 and communicate with the zone 80, so that a part of the fluid within zone 80 can be directed radially outwardly on to the ends of the winding 21. The remainder of the fluid within the zone 80 can then pass down the slots 31, 32 in the core 30, through the passages defined between adjacent columns of the winding 12, so that cooling fluid is brought into contact with each of the turns of the winding 12. After passing through the slots 31, 32 fluid enters a zone 81 adjacent the coil support block 37 and passes radially outwardly through a pair of nozzles 78 in the support block 37, to cool the other end of the winding 21. The nozzles 78 are similar to the nozzles 77 and are arranged diametrally on the block 37. The cooling fluid supplied through the tube 57 is effectively prevented from flowing to within the sun gear 13 by the sprag clutch 14 and by a plug 79 within the shaft 58, the shaft 58 sealingly engaging the inner element 63 of the sprag clutch 14.

The permanent magnet rotor of the pilot exciter alternator 17 is shown in detail in FIGS. 10 and 11, and comprises an annular, cup-shaped ring 90 to which 8 permanent magnets 91 are adhesively attached, the magnets being arranged so that their radially outer faces are of alternate polarities. Between the magnets 91 are non-magnetic spacers 92. The gaps between the magnets 91 and spacers 92 are filled with synthetic resin and the peripheral faces of the magnets 91 and spacers 92 are machined cylindrical and are surrounded by a tight fitting monel metal sleeve 93. The masses of the magnets 91 and spacers 92 are small, reducing the centrifugal forces thereon, and these parts are further restrained against outward movement by the sleeve 93.

The magnets 91 are of samarium cobalt, the effect being that notwithstanding their small masses the magnets 91 have sufficient flux to induce the required voltage in the coil 16.

The drive for the generator will now be described, with particular reference to FIGS. 3, 4 and 12, corresponding parts in these figures being given identical reference numbers.

Drive to the generator is applied by means of a two-input differential arrangement in the form of an epicyclic gear 100, of which the sun gear 13 forms a part, the sun gear 13 providing an output gear element. A planet wheel carrier 101 is mounted by bearing 99 for rotation relative to the shaft 58 and carries three planet wheels 102 which mesh with the sun gear 13. Bearing 99 is supported by a portion 98 of the housing which also supports the stator winding 16 of the pilot exciter alternator 17, so that the winding 16 lies within the bearing 99. The carrier 101 provides a first input element for the epicyclic gear 100 and has an integral spur gear 103 which meshes with a gear 104 secured to a shaft 105. The shaft 105 is coupled to an input drive shaft 106 by means of a temperature-responsive disconnect device 107, later to be described in detail.

Surrounding the planet wheels 102 and meshing therewith is an internally-toothed ring gear 108 which is supported for rotation relative to the shaft 58. The ring gear 108 forms a second input element of the epicyclic gear 100 and is formed at one end of a stepped annular sleeve 109, at the other end of which is a spur gear 110. The spur gear 110 meshes with a gear 111 which is mounted on the shaft 105 for rotation with respect thereto.

A hydraulic drive unit 112 comprises a variable-stroke axial piston hydraulic machine 113 connected in a series hydraulic circuit with a fixed-stroke axial piston hydraulic machine 114. The rotor axes of the machines 113, 114 are aligned. A further hydraulic drive unit 115 is identical with the unit 112 and includes axial piston machines 116, 117. The rotational axes of the units 112, 115 are in spaced parallel relationships with each other with the axis of the rotor 10 of the generator.

Identical gears 118, 119 are secured to the input shafts of the respective machines 113, 116 and mesh with a spur gear 120 which is secured to the shaft 105. Identical gears 121, 122 are secured to the output shafts of the respective machines 114, 117 and mesh with a spur gear 123 which is secured to the gear 111 for rotation therewith about the shaft 105. The shaft 105 lies between the units 112, 115 and is parallel to the axis of the generator rotor 10.

As shown in FIG. 4 the units 112, 115 lie closely adjacent the main generator stator formed by the windings 18, 21. Furthermore the units 112, 113, which lie in the spacings between the gears 118, 121 and the gears 119, 122, do not, as indicated in FIG. 3, overhang the overall axial dimension of the windings 18, 21.

The pilot exciter alternator 17 provides an a.c. control signal on a line 124. Since the pilot exciter alternator 17 is coupled directly to the sun gear 13 and shaft 58, that is on a side of the clutch 14 remote from the alternators 19, 22, the frequency of the signal on line 124 is proportional to the speed of the shaft 58, even though the speed of the alternators 19, 22 may be higher than that of the shaft 58. This latter situation can arise if the output of the main alternator 22 is connected in parallel with the outputs of other, similar alternators. The alternator 22 may be driven in step by these other alternators, even though the speed of the shaft 58 falls.

An electro-hydraulic actuator device 125, later to be described in detail, is powered by a fluid pressure derived from the impeller 66, and is responsive to variations in the frequency of the signals on line 124 to vary, in a known manner, the angles of swash plates 126, 127 of the respective machines 113, 116. The swash plates 126, 127 are movable in unison in either direction from zero stroke positions to reverse the directions of rotation of the gears 121, 122 and hence the direction of rotation of the ring gear 108 of the epicyclic gear 100. When the speed of the shaft 58 is at its desired value, and the swash plates 126, 127 are at zero stroke positions the ring gear 108 is stationary and the speed of the shaft 58 is dependent on that of the input drive shaft 106 only. If the speed of the shaft 58 rises above its desired value, movement of the swash plates 126, 127 is such as to cause the ring gear 108 to rotate in a direction which reduces the speed of the shaft 58 back to its desired value. A fall in the speed of shaft 58 likewise causes the ring gear 108 to be rotated in a direction to increase the speed of shaft 58 back to its desired value.

The hydraulic circuit of the generator arrangement is shown in FIG. 13, corresponding parts of the hydraulic circuit which are also shown in FIGS. 3, 4 and 12 being given identical reference numerals.

Two scavenge pumps 130, 131 are driven by the respective gears 118, 119. The pumps 130, 131 are positioned so as to lie closely adjacent the wall of the housing 24. The pumps 130, 131 are also positioned so that, when the axis of the rotor 10 is substantially horizontal, in a majority of orientations of the generator arrangement about the rotor axis, one or both of the pumps 130, 131 will lie in any pool of liquid hydraulic fluid collecting within the housing 24. In fact, hydraulic fluid will accumulate as a pool in the housing 24 only when the arrangement is not in use, at all other times free hydraulic fluid within the housing 24 is dispersed substantially evenly through the housing as a mist. The housing 24 does not include a reservoir or sump per se for hydraulic fluid, and in use the scavenge pumps 130, 131 draw in whatever is present in their vicinity and supply it via a magnetic chip collector 132 and a filter 133 to a cooler 134 which is outside the housing 24. The cooled and filtered mixture of air and hydraulic fluid is supplied to the annular inlet passage 74, and a proportion of this mixture passes through the tube 57 to cool the main exciter alternator 19 and main alternator 22, as described above.

Since the delivery pressure of the scavenge pumps 130, 131 is normally greater than 50 psi the remainder of the mixture in the annular inlet passage 74 can enter the pumping chamber 70, where it is acted upon by the impeller 66. The impeller 66 acts as a centrifugal separator to deliver hydraulic fluid substantially free of air, to the annular outlet passage 75 at 350 psi. The separated air, together with a proportion of the hydraulic fluid, can re-enter the general volume of the casing via the annular passage 73 which extends from the inner end of the wall 72.

The hydraulic fluid delivered at the outlet 75 passes to a start valve 135, which effectively comprises a pair of check valves arranged back-to-back, and which has an outlet connection 136. The arrangement of the start valve 135 is such that whichever of the pressures at the outlet 75 or at the outlet of the filter 133 is the higher, is delivered to the outlet connection 136.

The fluid in connection 136 is delivered by a pipe 137 to the port plates 138, 139 of the respective hydraulic units 112, 115 to provide a boost supply. As shown in FIGS. 12 and 13 the port plates 138, 139 are connected in a loop by pipes 140 and passages 150. A gallery 141 in a wall of the housing 24 communicates with the passages 150 to supply hydraulic fluid to a connection 142 which extends through the rotor 15 of the pilot exciter alternator, into a chamber within the shafts 58. This fluid can then pass out through radial passages 143 in the shaft 58 and planet wheel carrier 101 to lubricate the differential gear 100.

A junction 151 between the port plates 138, 139 communicates via a passage 144 with a spring-loaded constant pressure valve 145 whose outlet communicates with the pressure supply inlet 146 of an electro-hydraulic valve 147. The valve 147 is a MOOG type 30 servo valve with its windings connected in series, these windings being energisable by a current which is responsive to the electrical speed signal on the line 124 from the pilot exciter alternator 17. The valve 147 forms part of the electro-hydraulic actuator device 125 which controls the position of the swash plates 126, 127.

The start valve 135 in the hydraulic circuit ensures that, at start up and before the impeller 66 starts to deliver de-aerated hydraulic fluid, a sufficient pressure is present in the hydraulic units 112, 115 to prevent them from rotating idly and thus applying no reaction to the ring gear 108 of the differential gear 100. As soon as the pressure delivered by the impeller 66 exceeds that from the scavenge pumps 130, 131, the start valve 135 operates to pass this high pressure to the remainder of the system. A pressure responsive by-pass valve 148 opens at a predetermined level of pressure difference across the external cooler 134, so that during cold starting conditions sluggish flow through the cooler 134 does not prevent fluid from reaching the inlet passage 74 and thence passing to the impeller 66.

FIG. 14 shows, diagrammatically, the electro-hydraulic actuator device 125. As indicated above, the device 125 includes a MOOG servo valve 147 to the supply inlet 146 of which the fluid pressure PS from the constant pressure valve 145 is applied. The servo valve 147 is responsive to electrical current signals on a line 160 from an electronic control circuit 161, later to be described in detail. The circuit 161 is responsive to variations in the frequency of the speed signal on line 124 from the pilot exciter alternator 17 to vary the current signal on line 160. The servo valve 147 is operable to derive two control pressures C1, C2 from the supply pressure PS, the pressure C1 increasing as the pressure C2 decreases, and vice versa.

Two single-acting piston and cylinder units 162, 163 are operable by the control pressures C1 and C2 respectively, and are respectively coupled to the swash plates 126, 127 of the variable-stroke machines 113, 116. The swash plates 126, 127 are inter-linked so as always to move in unison, and the arrangement is such that the machines 113, 116 have zero displacement, to hold the ring gear 110 stationary, when the resultant ratio of the speeds of the input and output shafts 106, 58 is such as to provide the required output shaft speed. The piston and cylinder unit 162 is spring biased, so that in the event of failure of the supply pressure PS the swash plates 126, 127 are moved in a direction to cause the speed of the shaft 58 to be a minimum. The servo valve 147 is, moreover, adjusted to have a mechanical bias so that in the event of failure or interruption of the output from the circuit 161, the equilibrium state of the servo valve 147 is that corresponding to swash plate positions which tend to reduce the speed of the shaft 58.

The speed signal of line 124 is a sine wave whose frequency is proportional to the speed of the output shaft 58 of the differential gear 100. As shown in FIG. 16 a squaring circuit 170, as for example a Schmitt trigger circuit, is responsive to the signal on line 124 and supplies the resultant generally square wave to a shaping circuit 171. The shaping circuit 171 is conveniently a monostable multivibrator, which provides a constant pulse-width frequency signal. An integrator circuit 172 is responsive to the output of the shaping circuit 171 to provide, at an output connection 173, a voltage signal which is proportional to the frequency of the signal on line 124. Squaring circuit 170, shaping circuit 171 and integrator 172 thus combine to provide a frequency to voltage converter 174, the voltage signal at connection 173 is applied via a power amplifier 175 and a switching circuit 176 to the line 160. A limit detector circuit 177 is responsive to excursion outside predetermined limits of the voltage input signal to provide a switching signal on a line 178. The switching circuit 176 is responsive to the signal on line 178 to remove the control signal on line 160. Thus, excursion of the voltage signal at the input of the power amplifier 175 beyond the aforesaid predetermined limits causes, by removing the control signal on line 160, the mechanical bias of the servo valve 147, referred to above, to move the swash plates 126, 127 in directions which tend to reduce the speed of the shaft 58. The generator arrangement described above has a three-phase electrical output. A comparator circuit 179 is responsive to the voltage and current in one phase of the electrical output, an respective lines 180, 181. The comparator circuit 179 is also responsive to the voltage and current in one phase of the electrical output of a further generator arrangement 182 which may be connected in parallel with the generator arrangement previously described. The voltage and current signals from the further generator arrangement 182 are applied to the comparator circuit 179 on respective lines 183, 184. The comparator circuit 179 provides a signal on a line 185 which can modify the input signal to the power amplifier 175. The arrangement is such that if the signals on lines 180, 181 indicate that the generator arrangement presently described is carrying more load than the arrangement 182, the input signal to amplifier 175 is altered in a sense to reduce the speed of the shaft 58. The generator arrangement of the present example is intended for aircraft use, to supply a three phase current at a frequency of 400 Hz, and since the main alternator 22 has a two-pole rotor winding 12, the rotor 10 of the generator is required to rotate at 24000 RPM. The limit detector circuit 177 applies a switching signal on line 178 when the voltage signal from the converter 74 corresponds to a speed of the shaft 58 which is below 7200 RPM or above 27000 RPM. During starting, therefore, the swash plates 126, 127 are biased to a minimum speed position of the drive arrangement until the rotor speed reaches 7200 RPM. The limit circuit 177 includes a latching circuit which is operative at a voltage signal corresponding to a speed above 27000 RPM that, in the event of over-speed switching the resultant fall in speed of the rotor 10 does not re-set the limit detector circuit 177, since such re-setting could result in speed oscillation of the arrangement.

The temperature responsive disconnect device 107, previously referred to in connection with FIGS. 3 and 12 is shown in detail in FIG. 17. The gear 104 is integral with a sleeve 190 and is journalled in bearing 191 in the housing 24. The sleeve 190 has internal helical splines 192 which engage complementary splines on a member 193. The axes of the splines 192 have only a small inclination to the axes of the sleeve 190 and member 193. The splines 192 are such that, in the normal direction of rotation of the member 193, there is a tendency of the latter to move to the left, as seen in the drawing, out of engagement with the sleeve 190. The member 193 has dogs 194 which engage complementary dogs on the input drive shaft 106. The dogs on the member 193 and shaft 106 are slightly undercut so that, in the normal direction of rotation of the shaft 106, there is a tendency for the member 193 to move to the right, into close contact with the shaft 106. The angles of the splines 192, and the undercuts on the dogs 194 are such that, in the absence of any restraint, the member 193 will, in fact, move to the left to disengage the dogs.

The member 193 is mounted on a tube 195 which is slidable within the sleeve 190. A washer 196 is captive in the sleeve 190 and a compression spring 197 is engaged between the washer 196 and a flange on the tube 195 to urge the latter to the left. Movement of the sleeve 195 to the left is prevented by a tubular spacer 198, a further washer 199 and a fusible spacer 200. The spacer 200 is engaged between the washer 199 and the member 193, and a circlip 201 engages both the tube 195 and the member 193, whereby movement of the tube 195 to the left under the influence of the spring 197 is prevented. During rotation the member 193 sits closely against the input shaft 106, as above described, and the helical splines 192 tend to urge the sleeve 190 and gear 104 to the right. This rightward movement is, however, prevented by the engagement of the sleeve 190 with the washer 196. No axial thrust is experienced by the bearing 191 or by a bearing 203 (FIG. 3) which supports the input shaft 106, as a result of thrusts applied by the splines 192 or the spring 197. The gears 111, 123 are mounted for free rotation on the sleeve 190, and are axially located thereon. Rotation of the sleeve 190 is transmitted to the shaft 105 through splines 202.

In the event that temperature within the housing 24 rises above that at which the fusible spacer 200 melts, the member 193 is urged to the left by the action of the splines 192, overcoming the engaging action of the dogs 194. This leftward movement is assisted by the spring 197, and the member 193 is carried into abutment with the washer 199. The spring 197 ensures that the member 193 remains in a position in which the dogs 194 cannot re-engage. Fluid from the filter 133 is supplied through a passage 204 (FIGS. 3 and 12) to the bore of the shaft 105 so that the temperature of this fluid can act on the fusible washer 198 with a minimum of delay.

Since, as referred to above, the main alternator 22 has a two-pole rotor and is required to provide an electrical output at 400 Hz, the rotor 10 is required to rotate at a speed of 24,000 RPM. In the arrangement described only the rotor 10, clutch 14, shaft 58, sun gear 13 and the rotor 15 of the pilot exciter alternator 17 are required to run at this speed. The ratio of the gears 101, 104 and those of the differential gear 100 are selected so that the speed of the planet wheel carrier 101 is not such as to cause excessive centrifugal loading on the planet wheel bearings.

The arrangement is such that a speed of 24,000 RPM at the generator rotor 10 can be maintained when the speed of the input drive shaft 106 varies between 9000 and 18000 RPM, i.e. a 2:1 speed range. Subject to the aforementioned centrifugal loading requirement the ratio of the gears 103, 104, 118, 119 and 120 may readily by altered so that the above 2:1 input speed range can be maintained, but with a different means speed. In addition the ratios of the gears 111, 122, and 123 may be altered to increase or decreases the acceptable range of input speeds from the valve of 2:1.

The provision of a combined pump and centrifugal liquid/air separator 66, 70 has the result that a separate swirl chamber for separation, as shown in U.S. Pat. No. 3,576,143, may be dispensed with. Additionally, since the 2-pole rotor of the alternator 22 is required to rotate at 24000 RPM and the impeller 66 also rotates at this speed, the pressure of the separated liquid is high enough to be supplied directly to the port blocks 138, 139 of the hydraulic units 112, 115, without the need for additional pressure-raising means.

The location of the impeller 66 coaxially with the rotors of the alternators 19, 22 has the effect that cooling fluid can pass directly to these alternators from the inlet of the chamber 70. The use of an unseparated liquid/air mixture at a low pressure for cooling these alternators is rendered possible by introducing the unseparated fluid directly into the rotor bores, the high speeds of these rotors being sufficient to discharge the cooling fluid on to the surrounding stators. The centrifugal separator is not therefore required to deliver the cooling fluid for these generators, and may be less massively constructed than would otherwise be the case.

Furthermore, supply of cooling fluid to the stators of the alternators 19, 22 by means of the centrifugal action of the rotors of these alternators ensures a thorough dispersal of cooling fluid, and effective cooling may be obtained with a relatively small volume of liquid. The total amount of liquid required to be circulated by the arrangement of the present invention is thus substantially less than is necessary in prior art generator arrangement, and in particular there is no need to provide a reservoir within the housing.

The use of the pilot exciter alternator 17 to provide an electrical control signal indicative of the speed of the output shaft 58 of the differential gear, avoids the use of a separate speed-sensing device, as for example the hydromechanical governer of U.S. Pat. No. 3,576,143, and also avoids the use of trains of drive gears between a speed sensing device and the output element of the differential gear.

The generator arrangement of the present invention is primarily intended for use in aircraft the input shaft of the arrangement being driven by one of the aircraft engines. It is therefore desirable that the arrangement should be as compact and light as possible.

It is an object of the invention to provide a generator arrangement whose power to weight ratio is an improvement on known generators, and the foregoing features contribute to this end.

We claim:

1. A generator arrangement comprising an electric generator having a stator and a rotor, a continuously variable ratio drive means having an input shaft and an output shaft, said output shaft being drivingly connected to the rotor of said generator, hydraulic control means, responsive to the speed of said output shaft, for varying the ratio of the speeds of said input and output shafts, a centrifugal liquid-air separator including an impeller, means for drivingly connecting said impeller to said output shaft for rotation at the speed of said output shaft, a first passage for delivering hydraulic fluid to said separator from which liquid is separated and pressurized by rotation of said impeller, and means for supplying directly to said control means the liquid separated and pressurized by said impeller.

2. An arrangement as claimed in claim 1, in which said electric generator comprises a main exciter alternator and a main alternator, the rotors of said main and exciter alternators being axially aligned.

3. An arrangement as claimed in claim 2, which includes a pilot exciter alternator whose rotor is axially aligned with the rotors of said main and exciter alternators.

4. An arrangement as claimed in claim 1, in which said generator rotor is axially aligned with said output shaft.

5. A generator arrangement comprising an electric generator having a stator and a rotor and including a main exciter alternator, a main alternator and a pilot exciter alternator, the rotors of said main alternator, main exciter alternator and pilot exciter alternator being axially aligned, a continuously variable ratio drive means having an input shaft and an output shaft, said output shaft being drivingly connected to the rotor of said generator, hydraulic control means, responsive to the speed of said output shaft, for varying the ratio of the speeds of said input and output shafts, a centrifugal liquid-air separator including an impeller, means for drivingly connecting said impeller to said output shaft for rotation at the speed of said output shaft, a first passage for delivering hydraulic fluid to said separator from which liquid is separated and pressurized by rotation of said impeller, and means for supplying directly to said control means the liquid separated and pressurized by said impeller, said impeller, said generator rotor and said output shaft being axially aligned.

6. An arrangement as claimed in claim 5 in which said impeller is directly connected to said generator rotor for rotation therewith.

7. An arrangement as claimed in claim 1, in which said variable ratio drive means comprises a differential gear having first and second input elements and an output element, said output element being drivingly connected to said generator, said control means comprising first and second positive displacement hydraulic machines, one of said machines being drivingly connected to said one input element and the other of said machines being drivingly connected to said other input element, passage means for interconnecting said machines in a series hydraulic circuit, and means, responsive to the speed of said output element, for varying the displacement of said first machine.

8. An arrangement as claimed in claim 7, in which said means for supplying separated liquid from said separator communicates with said hydraulic circuit.

9. An arrangement as claimed in claim 7, in which the means for varying the displacement of said first machine comprises an electro-hydraulic actuator device, said means for supplying separated liquid from said separator communicating with said electro-hydraulic actuator device.

10. An arrangement as claimed in claim 9, in which said electro-hydraulic actuator device is responsive to the frequency of an output signal from said generator.

11. An arrangement as claimed in claim 10, in which said actuator device comprises an electrically-operable valve which includes means for providing a first control pressure signal which is dependent on said output signal frequency, a movable element for varying the displacement of said first machine, and a first piston which is responsive to said control pressure signal and which is coupled to said movable element.

12. An arrangement as claimed in claim 11, which includes biasing means for urging said actuator device to an operating position which corresponds, for a given speed of said other input element, to a minimum speed of said output element.

13. An arrangement as claimed in claim 10, which includes a frequency to voltage converter circuit responsive to said output signal and operable to supply a voltage signal to said electrohydraulic actuator device.

14. An arrangement as claimed in claim 1, which includes a housing surrounding said generator, said drive means and said control means, and in which said means for delivering fluid to said separator comprises a scavenge pump within said housing, said scavenge pump being drivingly connected to said input shaft.

15. An arrangement as claimed in claim 1, in which said separator impeller has a plurality of radially extending blades, and a chamber surrounding said impeller and having first and second annular walls adjacent respective axial ends of said impeller blades, the distance of the inner edge of said first wall from the axis of said impeller being greater than that of said second wall, a space between said first wall and said impeller defining an inlet for said chamber, and a space between said second wall and said rotor defining a spill outlet from the chamber.

16. An arrangement as claimed in claim 1, in which said variable ratio drive means includes a differential gear and which includes means for delivering said separated liquid to said differential gear for lubrication thereof.

17. A generator arrangement comprising an electric generator having a stator and a rotor and including a main exciter alternator and a main alternator, the rotors of said main and exciter alternators being axially aligned, a continuously variable ratio drive means having an input shaft and an output shaft, said output shaft being drivingly connected to the rotor of said generator, hydraulic control means, responsive to the speed of said output shaft, for varying the ratio of the speeds of said input and output shafts, a centrifugal liquid-air separator including an impeller, means for drivingly connecting said impeller to said output shaft for rotation at the speed of said output shaft, a fluid passage for delivering hydraulic fluid to said separator from which liquid is separated and pressurized by rotation of said impeller, means for suppling directly to said control means the liquid separated and pressurized by said impeller, and a further passage communicating directly with an inlet of said separator for delivering fluid to the rotors of said generator.

18. An arrangement as claimed in claim 17 in which said further passage extends axially within said rotor.

19. An arrangement as claimed in claim 17, in which said further passage extends axially through said impeller.

20. A generator arrangement comprising an electric generator including a main exciter alternator and a main alternator having stators and having axially aligned rotors, a continuously variable radio drive means having an input shaft and an output shaft, said output shaft being drivingly connected to the rotors of said generator, hydraulic control means, responsive to the speed of said output shaft, for varying the ratio of the speeds of said input and output shafts, a centrifugal liquid-air separator including an impeller and a chamber surrounding said impeller, means for drivingly connecting said impeller to said output shaft for rotation thereby, a first passage for delivering hydraulic fluid to said separator, and means for applying directly to said control means the liquid pressurized by said impeller of said separator, a second passage extending axially through at least one of said alternator rotors, and a third passage communicating with said second passage and extending transversely of the axis of said one of said alternator rotors, for directing fluid into contact with the associated stator.

21. An electric generator arrangement for an aircraft comprising a rotary electric generator having a two-pole rotor part and a stator in which a voltage can be induced by rotation of said rotor, a differential drive means having first and second input elements and an output element, means for drivingly connecting said output element to said generator, driving means for rotating said first input element, and means responsive to the speed of said output element, for driving said second input element at speeds which tend to maintain said output element speed substantially constant.

22. A generator arrangement comprising an electric generator having a rotor and a stator, a differential gear axially aligned with said rotor and having two input elements and an output element, an input drive shaft drivingly connected to said input element, said output element being drivingly connected to said rotor, a first hydraulic unit comprising first and second axially-aligned hydraulic machines interconnected in a series hydraulic circuit, a second hydraulic unit comprising axially aligned hydraulic machines interconnected in a series hydraulic circuit, means for varying the displacement of one of said first and second machines and the displacement of one of said third and fourth machines, said first and third machines being drivingly connected to said input drive shaft and said second and fourth machines being drivingly connected to said second input element, said first and second hydraulic units being in spaced parallel relationship with the axis of said generator rotor, the circumferences of said units lying closely adjacent the circumference of said stator.

23. An arrangement as claimed in claim 22, in which said generator comprises two axially aligned alternators each having a rotor element and a stator element, and in which said drive units do not overhang the overall axial length of said stator elements in combination.

24. A generator arrangement as claimed in claim 22, in which said input drive shaft is in spaced parallel relationship with the axis of said generator rotor and lies between said hydraulic units.

25. A centrifugal pump comprising a housing, an impeller rotor mounted within said housing and having a plurality of radially extending blades, said housing having first and second annular walls surrounding the axis of rotation of said rotor adjacent respective axial ends of said blades, the distance of the inner edge of said second wall from said rotor axis being greater than that of said first wall, said walls defining a pumping chamber surrounding said rotor, and a main outlet from said pumping chamber adjacent the periphery thereof, a space between said first wall and said rotor defining an inlet for the pump, and a space between said second wall and said rotor defining a spill outlet for the pump.

26. A generator arrangement comprising an electric generator having a stator and a rotor, a differential gear having first and second input elements and an output element, an input shaft drivingly connected to said first input element and an output shaft drivingly connecting said output element to said electric generator, hydraulic control means, responsive to the speed of said output shaft, for varying the ratio of the speeds of said input and output shaft, said hydraulic control means comprising first, second, third and fourth positive displacement hydraulic machines, one of said first and second machines being drivingly connected to said one input element and the other of said first and second machines being drivingly connected to the other input element, passage means for connecting said first and second machines in a series hydraulic circuit, one of said third and fourth machines being drivingly connected to said one input element and the other of said third and fourth machines being drivingly connected to said other input element, passage means for interconnecting said third and fourth machines in a series hydraulic circuit, means for providing a first control pressure signal which is dependent on the frequency of an output signal from said generator, means for providing a second control pressure signal which increases and decreases as said first control pressure signal respectively decreases and increases, first and second pistons respectively responsive to said first and second control pressure signals, a linkage interconnecting said pistons for movement in unison, and first and second movable elements respectively coupled to said first and second pistons, for varying the displacement of said first and third machines respectively.

27. A generator arrangement comprising an electric generator having a stator and a rotor, a continuously variable ratio drive means having an input shaft, an input shaft, an output shaft, a differential gear having first and second input elements and an output element, said output element being drivingly connected to said output shaft, hydraulic control means, responsive to the speed of said output shaft, for varying the ratio of the speeds of said input and output shafts, said control means comprising first, second, third and fourth positive displacement hydraulic machines, one of said first and second machines and one of said third and fourth machines being drivingly connected to said first input element, the other of said first and second machines and the other of said third and fourth machines being drivingly connected to said second input element, passage means for interconnecting said first and second machines in a series hydraulic circuit, passage means for interconnecting said third and fourth machines in a series hydraulic circuit, and means responsive to the speed of said output element for varying the displacement of said first and third machines, said generator arrangement further comprising a centrifugal liquid-air separator including an impeller, means for drivingly connecting said impeller to said output shaft for rotation at the speed of said output shaft, a first passage for delivering hydraulic fluid to said separator from which liquid is separated and pressurized by rotation of said impeller, and means for supplying directly to said control means the liquid separated and pressurized by said impeller.

28. A generator arrangement comprising an electric generator having a stator and a rotor, a continuously variable ratio drive means having an input shaft and an output shaft, and an output shaft, said output shaft being drivingly connected to the rotor of said generator, hydraulic control means, responsive to the speed of said output shaft, for varying the ratio of the speeds of said input and output shaft, a centrifugal liquid-air separator including an impeller, means for drivingly connecting said impeller to said output shaft for rotation at the speed of said output shaft, a first passage for delivering hydraulic fluid to said separator from which said liquid is separated and pressurized by rotation of said impeller, means for supplying directly to said control means the liquid separated and pressurized by said impeller, a housing surrounding said generator, said drive means and said control means, said means for delivering fluid to said separator comprising a scavenge pump within said housing, said scavenge pump being drivingly connected to said input shaft, a second passage communicating with an outlet of said separator, a third passage communicating with an outlet of said scavenge pump, a fourth passage communicating with said hydraulic control means, and valve means for connecting said fourth passage to which ever of said second and third passages contains fluid at the higher pressure.

29. A generator arrangement comprising an electric generator having a stator and a rotor, a continuously variable ratio drive means having an input shaft and an output shaft, said output shaft being drivingly connected to the rotor of said generator, hydraulic control means responsive to the speed of said output shaft, for varying the ratio of the speeds of said input and output shaft, a centrifugal liquid-air separator including an impeller, means for drivingly connecting said impeller to said output shaft for rotation at the speed of said output shaft, a first passage for delivering hydraulic fluid to said separator from which liquid is separated and pressurized by rotation of said impeller, and means for supplying directly to said control means the liquid separated and pressurized by said impeller, said impeller, said generator rotor and said output shaft being axially aligned.

* * * * *